United States Patent
Sastri

[11] 3,835,537
[45] Sept. 17, 1974

[54] IMPROVED CUTTING TOOL
[75] Inventor: Aiyaswami S. Sastri, Stow, Mass.
[73] Assignee: The Gillette Company, Boston, Mass.
[22] Filed: Mar. 19, 1973
[21] Appl. No.: 342,755

Related U.S. Application Data
[62] Division of Ser. No. 161,158, July 9, 1971, Pat. No. 3,761,372.

[52] U.S. Cl............................ 30/346.53, 30/346.55
[51] Int. Cl.............................................. B26b 21/54
[58] Field of Search....... 30/346.53, 346.54, 346.55; 51/285; 204/192

[56] References Cited
UNITED STATES PATENTS

| | | | |
|---|---|---|---|
| 3,345,202 | 10/1967 | Kiss................................. | 30/346.53 |
| 3,480,483 | 11/1969 | Wilkinson.......................... | 204/192 |
| 3,494,081 | 2/1970 | Taylor................................ | 51/285 |
| 3,632,494 | 1/1972 | Herte................................. | 204/192 |

FOREIGN PATENTS OR APPLICATIONS
1,030,401  5/1966  Great Britain.................. 30/346.55

*Primary Examiner*—Al Lawrence Smith
*Assistant Examiner*—J. C. Peters

[57] ABSTRACT

The sharpened edge of a cutting implement such as a razor blade is modified by subjecting the cutting edge to ion bombardment and strengthening material deposition steps so that a portion of the deposited strengthening material is removed, the cutting edge of the implement having a resulting tip radius of less than about 400 Angstroms and added strengthening material on the flanks so that at a distance of 6,000 Angstroms from the tip the added material has a total thickness of at least about 400 Angstroms.

4 Claims, 4 Drawing Figures

3,835,537

IMPROVED CUTTING TOOL

This application is a division of Ser. No. 161,158, filed July 9, 1971, entitled "Method for Producing an Improved Cutting Tool" now U.S. Pat. No. 3,761,372, issued Sept. 25, 1973.

SUMMARY OF INVENTION

This invention relates to improved cutting tools.

The forming of the cutting edges of razor blades by mass production techniques conventionally involves a series of abrading operations (grinding and honing) to produce the desired sharp and durable shaving edge. Each abrading operation forms a facet on the blade edge being sharpened, which facet is modified by subsequent abrading operations of increasing fineness. In general, the blade edge configuration is a wedge shape, the included solid angle of which is typically 20°–30°. The faces or sides of such cutting edges may extend back from the ultimate edge a distance up to as much as 0.1 inch or even more. Each face need not be a single uninterrupted continuous surface or "facet", but may consist of two or more "facets" formed by successive grinding or honing operations and intersecting each other along zones generally parallel to the ultimate edge. The final facet, i.e. the facet immediately adjacent the ultimate edge, has a width as low as 7.5 microns or even less compared with the diameter of beard hair which averages about 100 to 125 microns. Through shave test evaluation and measurement of the geometry of such sharpened cutting edges, it has been found that the cutting edge should have an average tip radius of less than about 500 Angstroms. A thin adherent layer of a corrosion resistant metal is often applied to the cutting edge of the blade. Further, a shave facilitating layer of polymeric material is also frequently applied to the blade edge. These layers must have adhesion compatability so that they remain firmly adhered to one another and to the substrate throughout the life of the cutting tool and desirably provide characteristics such as improved hardness and/or corrosion resistance while not adversely affecting the edge geometry.

It is a general object of this invention to provide novel and improved cutting implements, the cutting edges of which have improved mechanical properties.

A further object of the invention is to provide novel and improved razor blades which possess superior shaving properties.

In accordance with the invention, the edge geometry of a cutting implement such as a razor blade is modified by a process which includes the steps of forming a cutting edge by a suitable procedure such as grinding, honing, stropping, chemical etching, electrolytic sharpening, or forming with an appropriately shaped die; and then subjecting the cutting edge to ion bombardment and strengthening material deposition steps so that preferably a portion of the underlying substrate material and a portion of the deposited strengthening material is removed. The resulting cutting edge of the implement has an average tip radius of less than about 400 Angstroms, and the W6 facet width (the facet width at a distance of 6,000 Angstroms from the tip) is increased by at least about 400 Angstroms. Ion bombardment may be carried out by a variety of techniques, such as DC, AC or RF procedures and the strengthening material may be deposited by various techniques such as evaporation, sputtering or electron beam processes. The added material on the flanks of the cutting edge increase the mechanical strength of the implement without impairment of cutting effectiveness.

In preferred embodiments, two or more layers of edge strengthening material, each layer being at least 200 Angstroms in thickness are deposited by a sputtering technique on a multiplicity of blade elements while the blade edges are disposed in parallel alignment with one another and in a plane parallel to a target member spaced from the blade edges. A planar target member is used in one embodiment while a cylindrical target rod is used in another embodiment. It is preferred that the cutting edge initially have a tip radius of less than 2,000 Angstroms and that each layer of edge strengthening material be deposited to a thickness of less than about 500 Angstroms so that the tip radius not be unduly increased during each deposition step.

A razor blade in accordance with the invention has an average tip radius of less than about 400 Angstroms and added strengthening material on the flanks of the cutting edge that has a total thickness of at least 400 Angstroms at a distance of 6,000 Angstroms from the tip. Razor blades having this geometry exhibit excellent shaving characteristics and have a long shaving life. A wide range of blade substrate materials may be used, specific razor blade steel compositions with which the invention may be practiced including the following:

COMPOSITION IN %

| C | Cr | Mo | Si | Ni |
|---|---|---|---|---|
| 1.25 | .2 | — | .2 | — |
| 1.00 | 6.0 | — | 1.4 | — |
| .96 | 13.9 | — | .3 | — |
| .65 | 10.5 | 1.0 | .3 | — |
| .58 | 14.0 | — | .3 | — |
| .40 | 13.5 | 1.25 | .3 | — |
| .09 | 17.0 | .70 | 1.2 | 8.0 |

Other objects, features and advantages of the invention will be seen as the following description of particular embodiments progresses, in conjunction with the drawings in which.

DESCRIPTION OF PARTICULAR EMBODIMENTS

Figure 1:
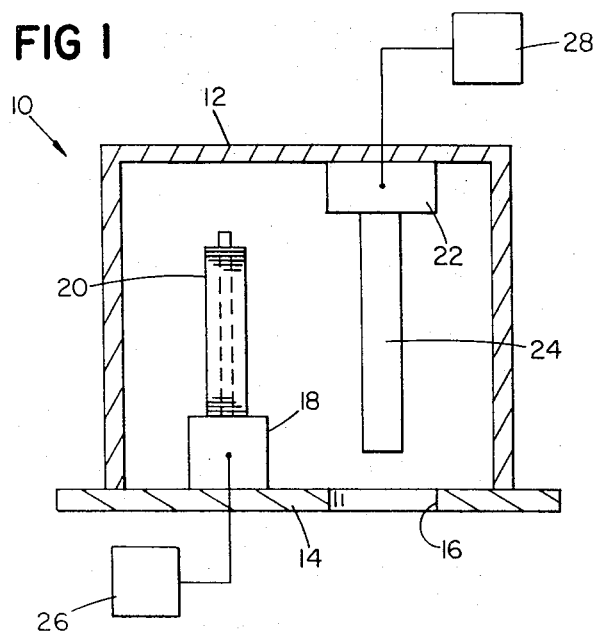
FIG. 1 is a diagrammatic view of apparatus suitable for practice of the invention.

Diagrammatically shown in FIG. 1 is a sputtering apparatus which includes a stainless steel chamber 10 having wall structure 12 and a base 14 in which is formed a port 16 which is coupled to a suitable vacuum system (not shown). Mounted in chamber 10 is a support 18 on which is disposed a stack of razor blades 20 and a support structure 22 for a target member 24. Support structures 18 and 22 are electrically isolated from chamber 10 and electrical connections are provided to connect blade stack 20 and target 24 to appropriate energizing apparatus 26, 28. It will be understood that this is a diagrammatic showing of suitable apparatus. In one embodiment the target 24 is a horizontally disposed disc 6 inches in diameter and ¼ inch thick; and 4 ½-inch long stack of blades 20 is placed on a 5-inch diameter aluminum support disc disposed parallel to target disc 24. A coil of razor blade strip may be similarly positioned on such a support with its sharpened edges defining a plane exposed to parallel to target 24. In another embodiment target 24 is a rod that has an exposed length of 29 inches and is 1 ¼ inches in diameter. Suitable coolant is circulated through the rod for cooling purposes. A series of stacks of razor blades (either in coil form or in 12 inch long axial extending stacks) are disposed about the target rod at equal distances therefrom.

Figure 2:
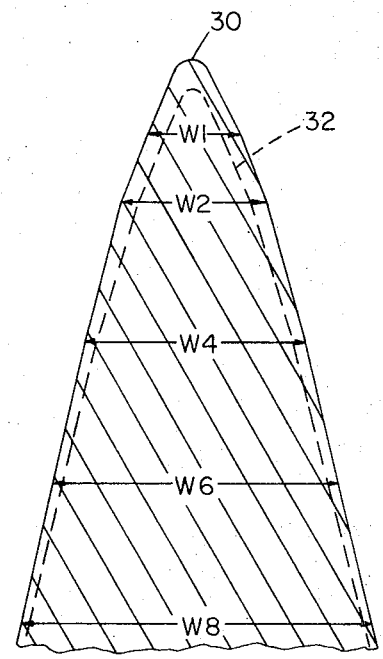
FIG. 2 is a diagrammatic view of the geometry of a razor blade edge sharpened by conventional means.

The geometry of the edge of a typical razor blade of commercial quality sharpened by conventional abrading techniques is shown in FIG. 2 at a magnification of about 100,000 times. The tip 30 has a radius that is typically in the range of 125–500 Angstroms, a typical average radius (the average of radius measurements taken at 5 to 10 points along the length of the blade edge) being about 250 Angstroms. The W1 flank width (at a distance of 1,000 Angstroms from the ultimate edge 30) is typically in the range of 1,200 to 1,400 Angstroms. The W2 width (at a distance of 2,000 Angstroms from the tip 30) is about 2,100 Angstroms; the W4 width (at a distance of 4,000 Angstroms from the tip 30) is about 3,200 Angstroms; the W6 width (at a distance of 6,000 Angstroms) is about 4,100 Angstroms; and the W8 width (at a distance of 8,000 Angstroms from the tip) is about 5,100 Angstroms.

These measurements were made by a high resolution electron microscopy technique in which a magnified image of a blade edge profile (silhouette) is photographed. The blades are cleaned by immersion in trichloroethylene; subjection to ultrasonic cleaning for 2 minutes; rinsing in a mixture of one-half acetone and one-half methanol; cleaned in warm air; and then demagnetized in a solenoid coil. A blade specimen in the order of one square millimeter in size with four sides, one of which is the original sharpened razor blade edge, is obtained by abruptly snapping the blade with the help of a suitable instrument such as a watchmaker's plier. The blade may be snapped in air or if the blade will not break readily in liquid nitrogen (at a temperature below the ductile to brittle transition value).

A 100 KV RCA EMU4 electron microscope is used with a standard air lock specimen holder modified to accommodate the small blade edge fragment. The microscope was fitted with a liquid nitrogen cooled baffle valve to reduce contamination during photography. The blade edge profile is held in the path of the electron beam so that a shadow image of the ultimate tip is cast on the final viewing screen. The magnification of the final image is controlled by the strength of the intermediate lens current and the focusing is achieved with control of the objective lens current. The microscope magnification was calibrated in terms of focusing lens current.

The tip radius of the resulting photomicrograph was measured by fitting 90° arcs of circles to the tip profile and selecting as the tip radius that edge profile that best fits the profile of the photomicrograph. The point to point resolution of the microscope is in the order of 5 Angstroms. The variation and average radius of a large number of edges from a particular batch of blades using this technique was within ± 12.5 Angstroms. The W1, W2 and other dimensions are similarly measured from the photomicrograph.

Figure 3:
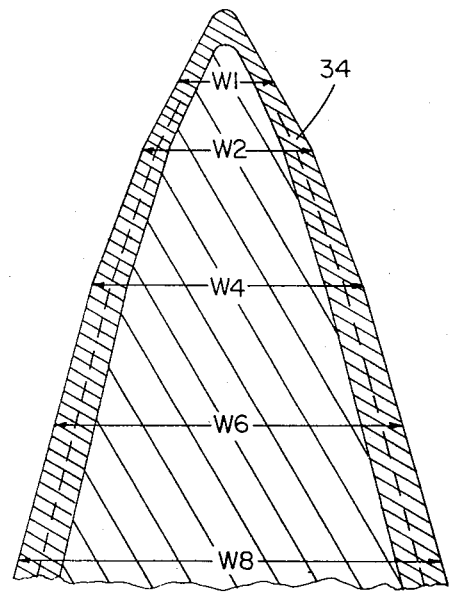
FIG. 3 is a diagrammatic view illustrating one example of razor blade edge geometry in accordance with the invention.

In operation of the apparatus shown in FIG. 1, sharpened blades 20 are disposed in a stack with their sharpened edges aligned and are placed in chamber 10 on support 18. The chamber is evacuated and the blade edges are subjected to ion bombardment, for example by a glow discharge maintained in argon at a pressure of 10 microns to modify the edge geometry as generally indicated by line 32 in FIG. 2 and specifically to reduce the tip radius, a typical radius reduction being about 100 Angstroms. The chamber is again evacuated and argon at a pressure of 5–8 microns is placed in the chamber. With the blade stacks and chamber grounded, an RF potential is applied to target 24 and argon ions are produced which bombard target 24 and release atoms of the target material. The released atoms are deposited on exposed surfaces, including the sharpened blade edges. This layer is applied uniformly to the thickness of less than 500 Angstroms. The RF power supply is then disconnected from the target 24 and the blades are subjected to further ion bombardment which removes material and reduces the radius in the tip region, more material being removed from the tip region of the blades than the flanks. One or more additional layers of edge strengthening material, either the same or different materials, may be deposited on the modified cutting edge. The resulting blades have a cutting edge geometry of the nature diagrammatically indicated in FIG. 3 in which the tip radius is preferably less than 300 Angstroms and the W6 dimension has increased by at least 400 Angstroms. After conventionally sharpened blades are processed in this manner with the deposition of two layers of edge strengthening material, each layer having a thickness of about 250 Angstroms, the blades have a typical average tip radius of about 200 Angstroms, a typical W1 dimension of about 1,400 Angstroms, a typical W2 dimension of about 2,500 Angstroms, a typical W4 dimension of about 4,000 Angstroms, and a typical W6 dimension of about 5,150 Angstroms.

AS a specific example, a 4 ½-inch long stack of stainless steel razor blades having the following composition:

| | |
|---|---|
| carbon | .54 – .62% |
| chromium | 13.5 – 14.5% |
| manganese | .20 – .50% |
| silicon | .20 – .50% |
| phosphorus, max. | .025% |
| sulphur, max. | .020% |
| nickel, max. | .50% max. |
| iron | remainder | and sharpened to the edge geometry as indicated in FIG. 2, were placed on a 5-inch diameter aluminum disc support 18 in an RF sputtering unit. The target 24 was a pure chromium disc 6 inches in diameter and ¼ inch thick that had squares of pure platinum foil one centimeter on a side and 0.002 inch thick spot welded on its surface. The foil squares were spaced on the surface so that 27 percent of the chromium surface was covered with platinum. The platinum-chromium disc surface was disposed parallel to the sharpened blade edges at a distance of 2 ½ inches from those edges. RF power could be fed to the support plate 18 or to the target disc 24.

Pressure in the vacuum chamber 10 was reduced to 0.1 micron of mercury and then pure argon gas was bled into the chamber to a pressure of 10 microns of mercury. The aluminum disc was then connected to a DC source of power and with the chamber 10 grounded the blade edges were subjected to ion bombardment at a voltage of 1,800 volts and a current of 35 milliamperes for 7 minutes. The target 24 was covered by a metal shield during this step. The target was then similarly subjected to ion bombardment for 5 minutes while maintaining 10 microns of mercury pressure of argon gas in the chamber. The shield was then removed from between the blades 20 and the target 24, the chamber has evacuated and a 13.56 megahertz RF source was connected to target 24. 0.4 kilowatts of power (with a DC negative bias of about 3,400 volts and a superimposed RF signal of about 4,500 volts peak to peak) was applied for 75 seconds while maintaining argon at 10 microns pressure. The edges of the blades facing target 24 received a chrome-platinum alloy coating consisting of 58 weight percent platinum and 42 weight percent chromium to a thickness of about 250 Angstroms. Application of RF power was then terminated and the blade stack 20 again connected to the DC source and subjected to ion bombardment for seven minutes at 1,800 volts and a current of 35 milliamperes. The target was then reconnected to the RF source and cleaned for two minutes as above and then a second layer of chrome-platinum alloy 250 Angstroms in thickness was deposited by application of 0.4 kilowatts of power for 75 seconds. The cutting edges of the resulting blades have an alloy coating 34 and a tip geometry of the type shown in FIG. 3, typical values being an average tip radius of about 200 Angstroms, an average W1 dimension of about 1,400 Angstroms and an average W2 dimension of about 2,500 Angstroms, a typical W4 dimension of about 4,000 Angstroms, and a typical W6 dimension of about 5,150 Angstroms. A coating of polytetrafluoroethylene telomer was then applied to the edges of the blades in accordance with the teaching in U.S. Pat. No. 3,518,110. This processing involved heating the blades in an argon environment and provided on cutting edges of the razor blades an adherent coating of solid PTFE. These blades exhibited excellent shaving properties and long shaving life.

As a second example, blades were similarly processed for the application of two 250-Angstrom thick layers of chromium rather than the chrome-platinum alloy of the previous example. The resulting blades had a tip geometry substantially the same as that of the previous example. These blades also exhibited excellent shaving properties and long shaving life.

Figure 4:
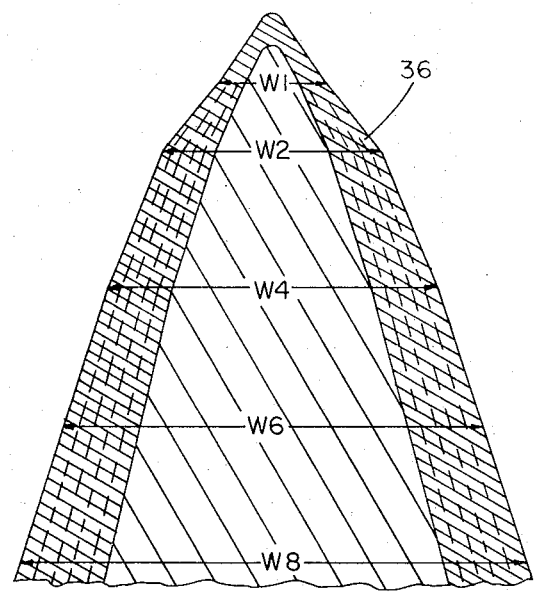
FIG. 4 is a diagrammatic view illustrating another example of razor blade edge geometry in accordance with the invention.

As a third example, a stack of blades was similarly processed employing a target 24 of chrome-platinum. The blade stack 20 was initially subjected to DC ion bombardment at a voltage of 1,800 volts and a current of 35 milliamperes for seven minutes. A chrome-platinum layer, 250 Angstroms in thickness, was then deposited by sputtering. The blade stack was then subjected to a second DC ion bombardment process for 7 minutes at 1,800 volts and 35 milliamperes current. A second chrome-platinum layer, 250 Angstroms in thickness, was then deposited. The cycle of ion bombardment and alloy deposition was repeated for a total of five cycles. The resulting cutting edges of the blades have an alloy coating 36 and a tip geometry of the type shown in FIG. 4, typical values being an average tip radius of about 250 Angstroms, an average W1 dimension of about 1,500 Angstroms, an average W2 dimension of about 3,200 Angstroms, an average W4 dimension of about 4,850 Angstroms, an average W6 dimension of about 6,200 Angstroms, and an average W8 dimension of about 7,400 Angstroms. A coating of polytetrafluoroethylene telomer was then applied to the edges of the blades and these blades also exhibited excellent shaving properties and long shaving life.

As still another example, sharpened blades were placed in eighteen stacks, each 12 inches in length, in a chamber in which was disposed a cylindrical target rod, having an exposed length of 29 inches, the exposed surface area of which was 19 percent platinum and 81 percent chromium. The chamber was evacuated and argon at a pressure in the range of ten microns was placed in the chamber. The blade tip radii were reduced by subjecting the blades to DC ion bombardment for 5 minutes at a voltage of 1,600 volts negative and a current of 1.25 amperes. The blade stacks were then connected to ground and 2.5 kilowatts of incident RF power (at a frequency of 13.56 megacycles and a DC negative bias of about 900 volts with a superimposed RF signal of about 1,000 volts peak to peak) and a minimal reflected power was applied to target 24 for 4 minutes, producing a chrome-platinum alloy coating having a thickness of about 200 Angstroms. DC ion bombardment was then repeated at an argon atmosphere at 10 microns pressure, a voltage of 1,600 volts negative, and 1.25 amperes current being maintained for 5 minutes. The blade stacks were then connected to ground and 2.5 kilowatts of RF power were again applied to target 24 for 4 minutes to deposit a second layer of chrome-platinum alloy 200 Angstroms in thickness. A coating of polytetrafluoroethylene telomer was applied to the blade edges as in the aforementioned examples. These blades exhibited excellent shaving properties and long shaving life.

Thus the invention provides an improved cutting implement such as a razor blade in which the tip radius of the implement is within the optimum range for cutting effectiveness while substantial amounts of edge strengthening material have been added on the flanks of the cutting edge. By limiting the thickness of each layer of strengthening material, tip geometry remains near optimum throughout the processing and excessive ion bombardment is not required.

While particular embodiments of the invention have been shown and described, various modifications thereof will be apparent to those skilled in the art and therefore it is not intended that the invention be limited to the disclosed embodiments or to details thereof and departures may be made therefrom within the spirit and scope of the invention.

What is claimed is:

1. A cutting implement having a cutting edge, the tip of which has an average radius of less than about 400 Angstroms, said cutting implement comprising a substrate having an edge with a tip radius of less than 500 Angstroms and added material metallurgically different from the material of said substrate on the tip and flanks of said substrate edge, said added material having a total thickness of less than 400 Angstroms on the tip of said substrate edge and a total thickness of at least 400 Angstroms on the flanks of said substrate edge at a distance of 6,000 Angstroms from the tip of said cutting edge, the total thickness of the added material at a distance of 1,000 Angstroms from the tip of said cutting edge being less than the total thickness of the added material at a distance of 6,000 Angstroms from the tip of the said cutting edge.

2. The cutting implement as claimed in claim 1 wherein said cutting implement is a razor blade.

3. The cutting implement as claimed in claim 2 wherein said added material is a chromium containing alloy.

4. The cutting implement as claimed in claim 2 wherein said added material is chromium.

* * * * *